Figure 1:
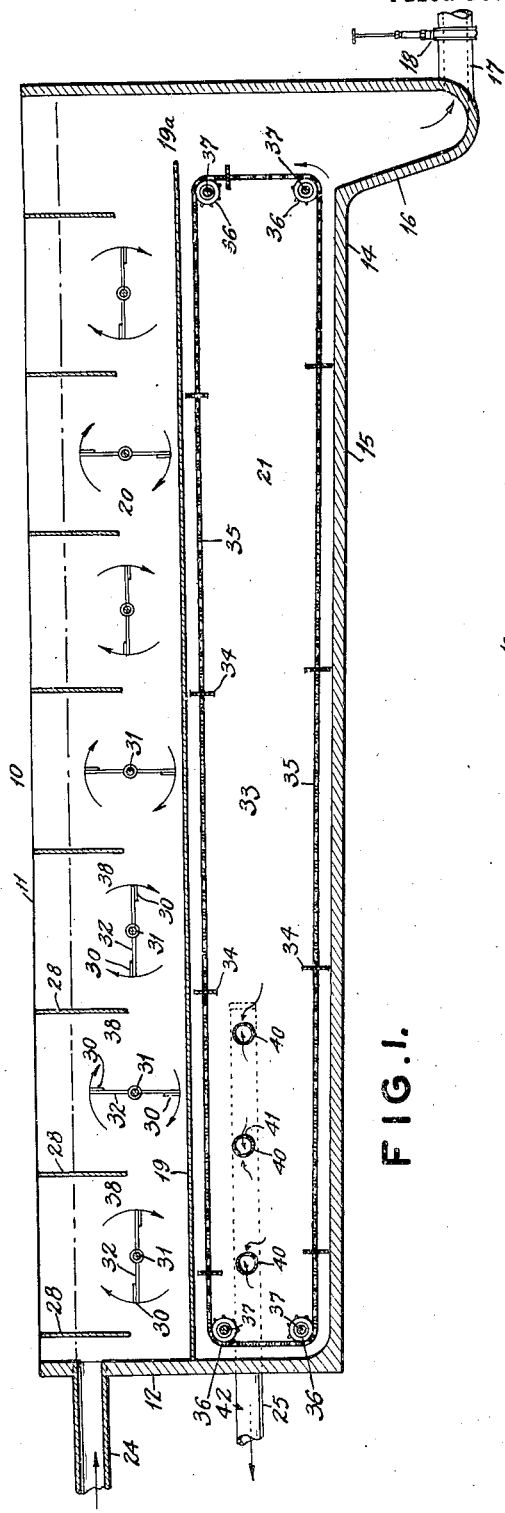

March 4, 1941. A. J. FISCHER 2,233,448
LIQUID CLARIFICATION APPARATUS
Filed Dec. 15, 1937

INVENTORS
ANTHONY J. FISCHER,
BY
ATTORNEY.

Patented Mar. 4, 1941

2,233,448

UNITED STATES PATENT OFFICE 2,233,448

LIQUID CLARIFICATION APPARATUS

Anthony J. Fischer, Jackson Heights, N. Y., assignor to The Dorr Company, Inc., New York, N. Y., a corporation of Delaware Application December 15, 1937, Serial No. 179,814

4 Claims. (Cl. 210—3)

In the field of clarifying organically polluted liquids such as sewage, trade wastes and the like, there is often used today flocculation followed by clarification or, as it is sometimes called, sedimentation. This invention relates to a novel arrangement in the same tank or basin of a flocculation zone and a sedimentation zone wherein features of advantage lie in the design and relationship of parts thereof.

The polluted organic matter is suspended in the liquid. Most of it is settleable as sediment in the form of sludge, if the liquid be held in quiescence as in a sedimentation zone or clarifier. But a quantity of these suspended solids is so small as to be colloidal and therefore difficult to settle. Flocculation has lately been resorted to ahead of sedimentation for coagmenting or amassing suspended matter into flocs or floc colonies and conditioning them as to denseness to make them more readily susceptible to settling in a classifier, along with the suspended solids that are normally settleable. By causing the flocs to meander in the liquid, there is a tendency for the flocs to entrap and adsorb other fine solids that may escape direct flocculating treatment.

The flocs thus formed are fragile and easily disintegrated so they must be treated gently, for if once disintegrated they are difficult of reflocculation. Therefore, it is important that the floc-laden liquid be drifted or passed as unmolestedly as possible from the flocculation zone to the sedimentation zone.

Again, as a major part of these flocs comprises organic matter that is putrescible and subject to becoming septic, bottom or floor sweeping must be provided in the sedimentation zone for continually raking or impelling to discharge the sediment or sludge resulting from the sedimentation of floc-laden liquid. That is, care must be taken to avoid accumulations of organic solids if septic conditions are to be avoided in the apparatus.

The flocculating bladed means generally proposed for use in the combination apparatus may be found described in the Patent to Smith, No. 1,893,451, and in the Patent to Darby No. 2,089,160, the latter being an improvement on the former. The type of traveling sediment or sludge impelling rakes, blades or flights mainly proposed for sweeping the floor area or areas of the sedimentation zone clean of sludge accumulation may be considered blades or flights moved in closed paths about generally horizontal axes, so that sections of the closed paths are substantially horizontal. Such mechanisms are exemplified by what are called scraper conveyors, namely, two or more endless belts or chains taking around sprockets with flights or blades extending transversely from one chain to the other.

Figure 2:
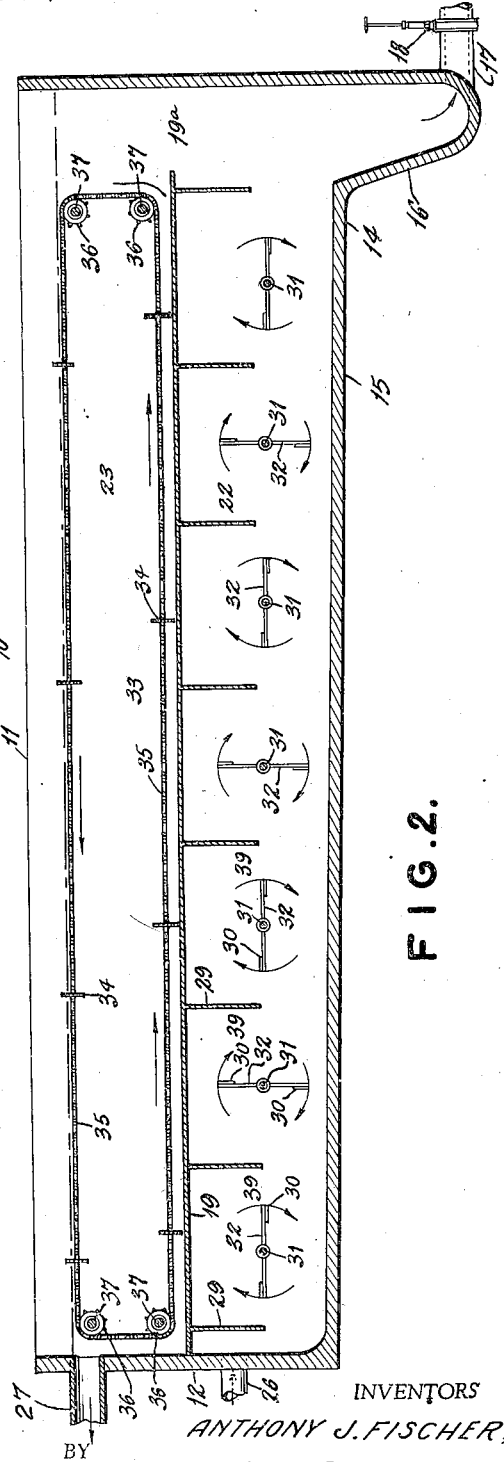

The novel features that I consider characteristic of my invention are set forth with particularity in the appended claims. The invention itself, however, both as to its organization and its method of operation, together with additional features, objects and advantages thereof, will best be understood from the following description of the illustrated specific embodiments thereof when read in connection with the accompanying drawing, in which Fig. 1 is a longitudinal sectional elevation of a flocculator-clarifier unit having the flocculation zone superposed over the sedimentation zone;

Fig. 2 is a longitudinal sectional elevation of a flocculator-clarifier in which the sedimentation zone is superposed over the flocculation zone.

In the specification and in the drawing the same reference characters designate like functioning parts.

In each form of apparatus illustrated 10 designates a tank or basin of a flocculator-clarifier unit. The tank or basin is of a rectangular or oblong form. It comprehends vertical side walls, as 11, vertical end walls 12 and 13, which may be referred to respectively as front and rear end walls, and a bottom 14 having a sloping floor section 15 longitudinally inclined toward a sediment-receiving sump or depressed section 16 that is provided in and by the rear end portion of the bottom. This sump is in the form of a trough extending transversely of the basin or tank and entirely across the same. The sump is provided with a sediment or slug discharge pipe 17 leading therefrom and having a stop or control valve 18 therein.

Each tank or basin has a horizontal partial partition 19, in the form of a horizontal tray or member extending the full width of the tank and from the front end wall 12 to a region proximate but somewhat ahead of the rear end wall 13. This horizontal partition divides the tank or basin into a flocculation compartment or zone and a sedimentation compartment or zone that are vertically disposed, to wit, one over the other, and which are in effect functionally separated one from the other except that they are in constant hydraulic communication with each other through a flow passage or space provided at the rear end of the horizontal partition. This communicating space may be viewed as a communicating passageway provided in and extending through the partition at the rear end thereof and is designated as 19a in both Figs. 1 and 2.

In Fig. 1 the flocculation compartment or zone 20 is located over the sedimentation compartment or zone 21. In Fig. 2 the flocculation compartment or zone 22 is located below the sedimentation compartment or zone 23.

In each form of apparatus illustrated there is an influent feed pipe by which incoming liquid to be treated is delivered into the front or head end of the flocculation compartment. There is also an effluent outlet pipe by which treated liquid is passed from an upper forward section of the sedimentation compartment or zone.

According to Fig. 1 the influent feed pipe 24 delivers the incoming liquid through the end wall 12 into the flocculation compartment or zone 20 and effluent outflow means 25 provides pipes by which effluent is conducted from the upper forward end of the sedimentation section or compartment 21.

According to Fig. 2 the incoming feed is supplied through influent feed pipe 26 so as to be delivered through the front end wall 12 into the forward or head end of the flocculation compartment 22. The clarified effluent passes from the upper portion of the sedimentation compartment 23 through the front end wall 12 and outwardly from the apparatus through the effluent outlet pipe 27.

Each of the flocculation compartments mentioned is provided with horizontally-spaced vertically-extending partial partition members or transverse baffles, as 28 in Fig. 1 and 29 in Fig. 2. These baffles extend the full width of the flocculation compartment or zone and downwardly from the upper regions thereof to a position approximately midway the depth of the flocculation compartment to which they correspond.

The several baffles 28 divide the flocculation compartment 20 of Fig. 1 into separate open bottom compartments 38 and baffles 29 divide the flocculation compartment of Fig. 2 into separate open bottom compartments 39. As to the baffles 28 of Fig. 1 that one which is located nearest the front end wall is disposed only a relatively short distance ahead thereof and functions as a flow-retarding barrier because of its being located directly ahead of the delivery end of the influent pipe 24. This arrangement causes this particular baffle to also function as a flow-distributing member whereby there is a relatively uniform delivery of incoming liquid across the entire receiving end of the flocculation compartment 20. Likewise, as to the transversely extending baffles 29 of Fig. 2 that one which is nearest the front end wall of the flocculation compartment 22 is spaced only a relatively short distance ahead of the end wall and directly ahead of the delivery end of the influent pipe 26. The result of this arrangement is that this baffle functions as a flow-retarding barrier and as a distributing baffle whereby incoming liquid supplied for treatment is distributed across the entire width of the flocculation compartment 22. These baffles or partitions may be of any desired size and number. They materially contribute to the control of the flow of liquid and quiescent conditions of the flocculation zone so that the movable blade flocculation means for coagmenting suspended material into settleable flocs may effect agitation conducive to the realization of floc-laden liquid within the flocculation zone and the drift thereof into the sedimentation zone without causing agitation sufficient to disintegrate the floc colonies formed in the flocculation zone. A flocculation means or movable bladed flocculation mechanism as it may be called is provided for each flocculation compartment or zone and it comprises a plurality of sets of paddles or blades as 30 arranged in groups and extending transversely of the flocculation zone of the tank to which it corresponds. The groups of blades or paddles 30 are mounted on shafts 31 which are journaled in suitable bearings in the side walls of the tank. Each of the shafts 31 carries three groups of blades or paddles of which two side groups are located adjacent the side walls of the tank while the third group is located centrally thereof, that is, midway between the side walls of the tank. Any number of groups of blades or paddles may, of course, be provided for each of the shafts and any number of shafts or paddles may be employed to suit the dimensions of the flocculation section of the particular tank. The blades or paddles 31 are connected with the shafts 30 by arms or members 32. The blades of the side groups of each shaft are disposed in alignment, while the blades of the central group of each shaft are staggered with relation to the blades of the side groups. Any suitable means may be provided for rotating the shafts in the required speed to effect coagmentation of the suspended material into suitable flocs.

The paddles or blades rotate in the direction indicated by the arrows in each figure hereof and the groups of blades or paddles operate in the lower portion of the flocculation zone to which they correspond. Each paddle during a portion of its movement extends into one or the other of the sub-sections of the flocculation compartment to which it corresponds and also during some part of its movement sweeps across the bottom of such space or compartment as is clearly illustrated by the drawings. The blades move slowly through the lower portion of the flocculation zone and the suspended material is caused to collect into settleable flocs of sufficient density to settle as the case may be upon the sediment-collecting floor provided by the tray or horizontal partition 19 of Fig. 1 or the floor provided by the sloping portion or inclined section 15 of Fig. 2.

In each form as illustrated the flocculation blades 30 travel when in the lower portion of their operative movement in directions counter to the general liquid flow within the flocculation section. This is the preferred mode of operating the bladed agitating means.

In each form of apparatus illustrated there is provided for the sedimentation zone thereof a sludge-raking or transferring means, collectively designated as 33, by which sedimented material engaged thereby is conveyed or impelled in a general longitudinal direction toward the rear or sump end of the tank.

Each sludge-transferring means 33 as shown comprehends transverse flights or scrapers 34, endless chains or belts 35 to which the flights or scrapers are connected, sets of sprockets as 36 on which the belts or chains are carried or meshed and shafts as 37 on which the sprockets are fixed. The shafts are journaled in suitable bearings in the side walls of the tank or otherwise supported from the tank structure. The shafts and the flights or scrapers that are carried from the shafts through the medium of the sprockets 36 and the endless chains or belts 35 are actuated by any suitable means.

Liquid after having been subjected to sedimentation is finally passed as clarified or supernatant liquid from the front or delivery end of the sedimentation zone. In Fig. 1 the transfer and delivery of the supernatant liquid from the sedimentation zone 21 is through the effluent outflow means 25 that consists of a plurality of transverse pipes 40 located in the sedimentation zone 21 and at the front portion of the same at spaced points beneath the upper horizontal section of the endless scraper conveyor formed by the blades 34 and the endless chains 35. The transverse effluent outlet pipes 40 are provided at opposite sides with apertures 41 for the passage of the supernatant liquid, and said pipes 40 communicate at one end with a common effluent discharge pipe 42 located exteriorly of the tank or basin and at one side thereof. In Fig. 2 the transfer and delivery of supernatant liquid from the sedimentation zone 23 is through the effluent outlet pipe 27 leading directly from the upper portion of the sedimentation zone through the front end wall 12 to the exterior of the tank or basin. Various other means may, of course, be provided for the discharge of the supernatant liquid from the sedimentation zone.

The arrangement and operation of the parts referred to lead to a construction in which floc nuclei and flocs can be developed or augmented and floc colonies can be amassed as suspension in the liquid bearing the same. It is to be remembered that in each form of apparatus illustrated there is a feed of liquid to be treated into the front end of the flocculation zone by the influent feed pipe 24 or 26 as the case may be and a release of a corresponding quantity of clarified liquid from the effluent outflow means 25 or 27 leading from the sedimentation zone corresponding to the flocculation zone. The feed of liquid for treating to the flocculation zone and the consequent release treated liquid from the sedimentation zone causes the liquid bearing flocs suspended therein to flow and driftingly pass as floc-laden liquid from the flocculation zone through the communicating passageway 19a at the rear end of the horizontal partition 19 into the sedimentation zone corresponding thereto without encountering disruptive agitation or obstructing means of a character to cause or effect disintegration of the floc or floc colonies as they pass from the flocculation zone into the sedimentation zone.

In the arrangement in Fig. 1 wherein the flocculation zone or compartment 20 is superposed above the sedimentation zone or compartment 21, the influent liquid to be treated is supplied through the influent feed pipe 24 into the upper zone 21 and is effectively distributed across the entire forward end or receiving section thereof because of the most forwardly disposed transverse baffle member 28. The liquid has what may be termed as a general longitudinal flow through this zone. However, the uppermost portions of the flowing liquid are locally pocketed and temporarily detained in localized areas provided by the horizontally spaced transverse baffles 28 which extend downwardly within the flocculation zone 22 to about midway the depth thereof. The lower portion of this flocculation zone being left open or unobstructed defines the longitudinal flow path along which the liquid must travel.

As to the flocculation blades 30, it has been pointed out that they move in circular paths about the axis or shaft 31 to which they correspond. In their lowermost positions they have movement counter to the general flow movement of the liquid passing along the flocculation zone. These blades are disposed so as to operate or function across the entire width of the tank, to wit, over the entire width of that portion of the tray or partial partition 19 over which they are located so that each and all of the successive portions of liquid flowing through the flocculation zone are engaged thereby and subjected to the agitation effects thereof.

Each of the paddles 30 during a portion of its revolution about its shaft passes into the lower portion of the open compartment with which it is associated and the solid material within the flocculation zone is formed into colonies of flocs and conditioned as to size and density within the flocculation zone and is settleable when the floc-laden liquid is passed from the flocculation zone into the sedimentation zone.

The agitation of the liquid within the flocculation zone 20 is ample to prevent any accumulation on the upper surface of the horizontal tray or partial partition 19 of putrescible organic material.

From the flocculation zone 20 the flocculating liquid with the settleable solids in suspension therein gradually flows and drifts through the submerged passageway 19a at the end of the tray or partition 19 downwardly toward and into the sedimentation zone 20. This downflow is in a manner which permits some of the settleable solids to gravitate or descend into the sediment-receiving section or sump 16. The flocculating liquid thus delivered into the sedimentation zone or section 21 has a general horizontal flow movement toward the forward end of the tank, to wit, in a direction toward the transverse withdrawal pipes 40. As the liquid moves horizontally toward the forward end of the sedimentation section more settleable solids gravitate toward and settle as sediment upon the inclined section 15 of the tank bottom and they are continually swept or raked and transferred toward the sediment-receiving sump 16 by means of transverse flights or scrapers 34 of the sludge-raking or transferring means 33 that is suitably actuated preferably from a motor in a manner well known in this art.

It will also be observed from an inspection of this figure that the flights or scrapers 34 which move in the direction indicated by the arrow also function to sweep, rake or scrape the lower surface or face of the transverse tray partition 19. It will thus be noted that the flights or scrapers by the operation just described prevent the accumulation on either the tank bottom or on the under face of the tray or partition of any substantial accumulation of sediment, sludge, scum or the like which might otherwise tend to collect upon the tank bottom or adhere to the underside of the horizontal tray or partition. In this sedimentation zone the liquid is flowed substantially free of the settleable matter therein. The settled matter or sediment which is ultimately transferred as sludge by the flights or scrapers 34 into the sediment discharge sump 16 is passed according to operative requirements to the exterior of the tank or basin through the sediment or sludge discharge pipe 17, the opening and closing of which pipe is controlled by the valve 18.

In the arrangement of this figure clarified supernatant liquid passes as effluent into the horizontally and transversely extending pipes 40 and therethrough into the pipe 41 through which the effluent is delivered to the exterior of the tank or basin.

The lower surface of the horizontal partition and the bottom of the tank are continually swept or raked by motor actuated flights or blades 25 travelling in the closed path having vertical and horizontal sections for impelling the sediment with the sump and the discharge element.

In the arrangement illustrated in Fig. 2 wherein the flocculation zone 22 is below the overlying sedimentation zone 23 the incoming liquid to be treated is supplied through the pipe 26 and is caused to be distributed across the entire feed-receiving section of the flocculation zone by the transverse baffle 29 that is located proximate the front end wall of the tank. As already indicated the depending baffles 29 divide the flocculation zone into the open bottom compartments 39. The several sets of flocculation blades or paddles 30 when turning with the shafts 31 therefor operate in substantially the same manner as the flocculating blades 30 described in connection with the arrangement of Fig. 1.

In the instance of Fig. 2 there is a progressive movement of floc-laden liquid in which the flocculatable solids have been formed or developed into colonies of flocs as to size and density so as to be settleable by the time the floc-laden liquid has reached the rear or delivery end section of the flocculation zone 22. The agitation within this zone is ample to prevent any accumulation on the upper surface of the inclined floor section 15 of putrescible organic material.

The flocculated liquid with some of the solids suspended therein slowly flows and drifts upwardly through the constantly submerged flow-path 19a into the rear end portion of the sedimentation zone or compartment 23. Some of the solids from the flocculated liquid gravitate directly into the sediment-receiving sump 16, while others, as just indicated, drift upwardly with the liquid flowing into the overlying sedimentation zone 23. The general path of travel of the liquid within the sedimentation zone 23 is from the rear portion thereof toward the front end wall 12. During this travel the settleable solids gravitate and lodge upon the transverse tray or partial partition 19 and are continually swept or raked therealong and transferred therefrom by the transverse flights or scrapers 34 of the sludge-raking and transferring means 33. In this manner sedimented solids are delivered into the upflowing flocculated liquid, and is therefore available as descending settleable material which aids as returns sediment in the flocculation operation and also in carrying down some of the suspended flocculated liquid which otherwise would have to drift upwardly into the sedimentation zone 23. Supernatant liquid passes from the uppermost forward end portion of the sedimentation zone through the outlet pipe 27 as relatively clarified effluent.

In Fig. 1 attention was called to the fact that the scrapers 35 serve to clean the underside of the tray or partial partition 19 of material which might tend to collect thereupon. The necessity for such cleaning of the underside of the partial partition in Fig. 2 is avoided because the motion and agitative effects of the flocculation paddles 30 as they operate prevent any accumulation upon the underside of the tray or partition 19, or even upon the transverse baffles 29, of matter that might go septic.

The arrangement of having a sedimentation zone above the flocculation zone gives a better return of the sediment or sludge to the flocculation zone, a condition always effective in flocculation. Also the arrangement of an uppermost sedimentation zone allows for better skimming of the floating scum inevitable when sewage is treated. The flights 34 when disposed as shown in Fig. 2 can be employed in the collecting and transferring of the scum from the main portion of the surface area of the liquid in the sedimentation zone.

The movable bladed flocculation mechanism or means which comprises the several sets of flocculation blades or paddles 30, operates for effecting agitation that furthers and aids the coagmentation and amassment of flocs and floc colonies, to maintain sufficient agitation within the flocculation zone served thereby whereby there is avoided or prevented the accumulation of organic material which might become septic if allowed to lodge and remain in the flocculation zone, to effect agitation sufficient and of a character to insure the drifting of the floc-laden liquid from the flocculation zone through the submerged passageway into the sedimentation zone, and all of this without violent agitation of a character sufficient to disintegrate or substantially disrupt the flocs and floc colonies which have been formed, developed or amassed by the agitation carried out in the flocculation zone.

The sludge-transferring means 33 which includes the flights or scrapers 34 and the endless chains or belts 35 may be described, as, or as embodying, an endless travelling conveyor element having transversely extending scrapers or sediment-impelling flights 34 and as having upper and lower long horizontal section or runs, and front and rear short vertical sections or runs. This endless conveyor element because of the arrangement described is effective to impel sediment to the discharge section of the tank incident to the movement of the transfer flights 34 thereof along the path of the lower strand section of the endless belt or chain 35. The endless conveyor element 33 for each of said Figs. 1 and 2 operates in the sedimentation section only of the tank. The general flow of liquid within that section is from the rear end of the tank to the forward end thereof. In each instance the lower horizontal strand of the endless element moves the scrapers and the sediment impelled thereby counter-currently to the liquid flowing through the sedimentation zone of the tank and at the same time the upper horizontal strand and the flights or scrapers on that particular strand move co-currently with the liquid flow within the sedimentation section. In respect to each form illustrated the conveying or raking of solids is in a direction counter to the general flow movement within the sedimentation zone, or as otherwise expressed, in a direction away from the clarifier effluent discharge area toward a rear end of the tank at which the sediment-discharge sump is located.

I claim:

1. Apparatus for clarifying liquids, comprising a tank having a substantially horizontal partition below the top of the tank and extending from one end of the tank toward the other end of the tank and defining a flocculation zone at one side of the partition and a sedimentation zone at the other side of the partition, said zones being superposed with respect to one another, said partition being so constructed and arranged as to form a flow passage at one end section of the tank for hydraulic communication between said zones, bladed agitating means operable in the flocculation zone at a speed sufficient to effect coagmentation of suspended material into settleable flocs, a discharge outlet for sediment at said end section of the tank, mechanism for impelling sediment from said sedimentation zone to said discharge outlet, influent means disposed substantially at the far end of the flocculation zone relative to said flow passage, and outlet means disposed substantially at the far end of the sedimentation zone relative to said flow passage for the flow of clarified supernatant liquid therefrom, whereby the liquid being treated passes from the influent means in a generally horizontally progressive direction through the flocculation zone, and from the flocculation zone through said passage into the sedimentation zone, and then away from said passage through said sedimentation zone in horizontally progressive direction to said outlet means for the clarified liquid.

2. Apparatus according to claim 1, in which the mechanism for impelling sediment comprises an endless travelling conveyor element provided with sediment impelling flights and having substantially vertical and substantially horizontal sections, effective to impel sediment to said discharge outlet, said sections being so disposed that the flights in their closed path pass co-currently with the flow through the tank along one section of said endless element and countercurrently thereto along another section thereof, one of the horizontal sections being located adjacent said horizontal partition.

3. Apparatus according to claim 1, in which said partition is located at the top of the sedimentation zone, and in which the mechanism for impelling sediment comprises an endless travelling conveyor element provided with sediment impelling flights and having vertical and horizontal sections, effective to impel sediment to said discharge outlet, said conveyor sections being so disposed that the flights in their closed path pass co-currently with the flow through the tank along one section of said endless element and countercurrently to the flow along another section thereof, one of said horizontal sections of the travelling endless conveyor element being disposed adjacent to said partition and operating thereon.

4. Apparatus according to claim 1, in which said partition is located at the bottom of the sedimentation zone, and in which the mechanism for impelling sediment comprises an endless travelling conveyor element provided with sediment impelling flights and having substantially vertical and substantially horizontal sections and effective to impel sediment to said discharge outlet, said sections being so disposed that the flights in their closed path pass cocurrently with the flow through the tank along one section of said endless element and countercurrently to the flow along another section thereof.

ANTHONY J. FISCHER.